Patented Feb. 9, 1926.

1,572,232

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE FILM COMPOSITION.

No Drawing. Application filed April 22, 1925. Serial No. 25,144.

*To all whom it may concern:*

Be it known that I, STEWART J. CARROLL, a citizen of the United States of America, residing at Rochester, in the county of Monroe and State of New York, have invented certain new and useful Improvements in Cellulose-Acetate Film Compositions, of which the following is a full, clear, and exact specification.

This invention relates to cellulose acetate compositions for making films and relates also to films embodying such compositions. One object of my invention is to provide a cellulose acetate composition which is flowable and may be made by the usual methods into permanently transparent and strong sheets or films of the desired thinness that will maintain their flexibility under adverse conditions, that are substantially waterproof or unaffected by ordinary photographic fluids, and possess the other desired properties for a support for sensitive photographic coatings. Another object of my invention is to provide a film having such qualities from such a flowable composition. Other objects will hereinafter appear.

I have found that a film-forming cellulose acetate composition, having the above mentioned desirable qualities can be obtained by mixing cellulose acetate, preferably the acetone-soluble species, with tributyrin in certain proportions, a common solvent such as acetone being employed to make the composition properly flowable in the usual processes of making films. I have also found that a film made from such a properly proportioned composition not only exhibits transparency, strength, resistance to photographic liquids, etc., but likewise has a remarkable resistance to conditions which ordinarily cause brittleness in cellulose acetate film. Films embodying my invention will retain useful flexibility even when exposed for more than a month to incubation at 65° C. While I shall now describe one form of my invention by way of example, it will be understood that I am not restricted thereto, except as indicated in the appended claims.

By way of illustration I dissolve 100 parts of acetone-soluble cellulose acetate in 300 to 500 (say 400) parts of acetone along with 10 to 35 parts by weight of tributyrin. 30 parts of tributyrin in said formula are especially effective, permitting transparency and at the same time insuring flexibility.

I prefer to use tributyrin which is substantially free from dibutyrin and monobutyrin, but these lower esters may be mixed with the tributyrin without harm up to the point where they render the mixture too hygroscopic.

The solutions given in the above illustration are sufficiently viscous and yet flowable to be used in the usual processes of film manufacture, the acetone volatilizing, but not too rapidly to impair the product.

Having thus described my invention, what I claim as new and desire to secure by Letters Patent is:

1. A flowable film-forming composition comprising 100 parts by weight of cellulose acetate, from 10 to 35 parts by weight of tributyrin, and sufficient solvent common to said ingredients to render the composition flowable.

2. A flowable film-forming composition of matter comprising 100 parts by weight of acetone-soluble cellulose acetate, 30 parts of tributyrin, and sufficient acetone to impart film-forming flowability to said composition.

3. As an article of manufacture a transparent film comprising cellulose acetate and sufficient tributyrin to maintain flexibility therein after prolonged heating at 65° C.

4. A transparent film which remains flexible after heating for more than a month at 65° C., comprising 100 parts by weight of acetone-soluble cellulose acetate and from 10 to 35 parts by weight of tributyrin.

Signed at Rochester, New York, this 10 day of April, 1925.

STEWART J. CARROLL.